US012233663B2

(12) United States Patent
LeWan

(10) Patent No.: US 12,233,663 B2
(45) **Date of Patent: *Feb. 25, 2025**

(54) ADJUSTABLE BRUSH HOLDING ASSEMBLY

(71) Applicant: James LeWan, Chicago, IL (US)

(72) Inventor: James LeWan, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,560

(22) Filed: Aug. 2, 2022

(65) Prior Publication Data

US 2022/0363090 A1 Nov. 17, 2022

Related U.S. Application Data

(63) Continuation-in-part of application No. 16/508,295, filed on Jul. 10, 2019, now Pat. No. 11,400,750.

(60) Provisional application No. 62/695,903, filed on Jul. 10, 2018.

(51) Int. Cl.
*B44D 3/12* (2006.01)
*A46B 17/02* (2006.01)
*B44D 3/14* (2006.01)

(52) U.S. Cl.
CPC .............. *B44D 3/123* (2013.01); *A46B 17/02* (2013.01); *B44D 3/12* (2013.01); *B44D 3/14* (2013.01)

(58) Field of Classification Search
CPC ........ B44D 3/121; B44D 3/125; B44D 3/123; B44D 3/12; B44D 3/122; B44D 3/14; B44D 3/00; B44D 3/06; B44D 3/08; A46B 17/02; A47F 7/0021; F16B 5/0233; A47L 13/512; A47G 29/08; A47B 81/005
USPC .................... 220/736, 697; 206/361; 211/65; 248/309.1, 309.2
See application file for complete search history.

(56) References Cited

U.S. PATENT DOCUMENTS

| | | | | | |
|---|---|---|---|---|---|
| 1,754,366 | A | * | 4/1930 | Lissy | B44D 3/123 248/113 |
| 2,043,643 | A | * | 6/1936 | Yenne | B44D 3/125 401/121 |
| 2,047,641 | A | * | 7/1936 | Mares | B44D 3/121 206/209 |
| 2,454,474 | A | * | 11/1948 | Nance | B44D 3/123 248/113 |
| 2,460,136 | A | * | 1/1949 | Leonard | B44D 3/123 248/113 |
| 2,466,850 | A | * | 4/1949 | Hoffman | B44D 3/128 220/699 |
| 2,498,511 | A | * | 2/1950 | Smith | B44D 3/125 248/113 |
| 2,521,049 | A | * | 9/1950 | Divis | B44D 3/125 248/113 |
| 2,555,810 | A | * | 6/1951 | Parsons | B44D 3/125 248/110 |

(Continued)

FOREIGN PATENT DOCUMENTS

CN 101862075 A * 10/2010

*Primary Examiner* — Devin K Barnett
(74) *Attorney, Agent, or Firm* — K&L Gates LLP

(57) ABSTRACT

A holder assembly for holding a painting tool within a paint container is provided. The holder assembly includes an inner tube including an attachment mechanism for receiving the painting tool, an outer tube that receives the inner tube, wherein the outer tube includes a securement means for attaching to the paint container, and a tightener to secure a position of the inner tube within the outer tube.

10 Claims, 5 Drawing Sheets

(56) References Cited

U.S. PATENT DOCUMENTS

| | | | | | |
|---|---|---|---|---|---|
| 2,560,228 | A * | 7/1951 | Kosorok | B44D 3/123 | 248/113 |
| 2,654,504 | A * | 10/1953 | Hyams | B44D 3/125 | 206/209 |
| 2,855,123 | A * | 10/1958 | Kintz | B44D 3/123 | 220/756 |
| 3,398,825 | A * | 8/1968 | Flook, Jr. | B44D 3/125 | 206/209 |
| 3,527,341 | A * | 9/1970 | Meade | B44D 3/125 | 206/209 |
| 3,531,073 | A * | 9/1970 | Cortina | B44D 3/123 | 248/113 |
| 4,121,798 | A * | 10/1978 | Schumacher | B44D 3/123 | 24/336 |
| 4,860,891 | A * | 8/1989 | Biggio | B44D 3/125 | 206/209 |
| 4,919,298 | A * | 4/1990 | Gregory | B44D 3/14 | 220/759 |
| 5,035,386 | A * | 7/1991 | Tucker | B44D 3/123 | 248/303 |
| 5,083,733 | A * | 1/1992 | Marino | B44D 3/123 | 248/309.4 |
| 5,097,967 | A * | 3/1992 | Sica | A47B 81/00 | 206/362 |
| D364,949 | S * | 12/1995 | Birch | D32/54 | |
| 5,641,007 | A * | 6/1997 | Falk | B44D 3/125 | 206/362.1 |
| 5,806,704 | A * | 9/1998 | Jamison | B44D 3/125 | 220/795 |
| 5,806,818 | A * | 9/1998 | Heywood | B44D 3/123 | 248/213.2 |
| 5,996,952 | A * | 12/1999 | Heywood | B44D 3/123 | 248/213.2 |
| 6,419,194 | B1 * | 7/2002 | LoSacco | B44D 3/123 | 248/113 |
| 7,187,261 | B2 * | 3/2007 | Cassar | H01F 7/0215 | 335/306 |
| 7,194,786 | B2 * | 3/2007 | Gagne | B44D 3/14 | 16/110.1 |
| 7,575,261 | B2 * | 8/2009 | Gagne | B44D 3/14 | 220/759 |
| 8,100,272 | B1 * | 1/2012 | Schaefer | A46B 17/06 | 211/65 |
| 8,132,681 | B2 * | 3/2012 | Afghan | A47K 1/09 | 211/66 |
| 2003/0121925 | A1 * | 7/2003 | Mowe | B44D 3/123 | 220/736 |
| 2004/0173718 | A1 * | 9/2004 | Song | B44D 3/123 | 248/213.2 |
| 2005/0035131 | A1 * | 2/2005 | Martinson | B44D 3/123 | 220/736 |
| 2005/0156085 | A1 * | 7/2005 | Radovan | A46B 17/02 | 248/213.2 |
| 2005/0184077 | A1 * | 8/2005 | Martinson | B44D 3/123 | 220/736 |
| 2006/0113310 | A1 * | 6/2006 | Hawkins | B44D 3/123 | 220/736 |
| 2006/0278780 | A1 * | 12/2006 | Kovall | B44D 3/123 | 248/213.2 |
| 2007/0045132 | A1 * | 3/2007 | Anderson | B44D 3/125 | 206/209 |
| 2007/0204423 | A1 * | 9/2007 | Keane | B44D 3/12 | 220/570 |
| 2009/0146022 | A1 * | 6/2009 | Paga, Jr. | B44D 3/123 | 220/736 |
| 2011/0147394 | A1 * | 6/2011 | Thorp | B44D 3/14 | 220/736 |
| 2012/0069696 | A1 * | 3/2012 | Van Geer | B44D 3/123 | 366/129 |
| 2013/0119064 | A1 * | 5/2013 | MacKay | B44D 3/123 | 220/736 |
| 2013/0233735 | A1 * | 9/2013 | Hurley | B44D 3/125 | 206/209 |
| 2013/0333131 | A1 * | 12/2013 | McCarthy | A46B 15/0095 | 15/159.1 |
| 2015/0034777 | A1 * | 2/2015 | Ionis | B44D 3/123 | 248/113 |
| 2015/0250296 | A1 * | 9/2015 | Dietmeyer | A45F 5/02 | 224/271 |
| 2015/0298496 | A1 * | 10/2015 | Payne | B44D 3/14 | 220/696 |
| 2016/0236444 | A1 * | 8/2016 | Immordino | B32B 3/00 | |
| 2016/0251118 | A1 * | 9/2016 | Seymour | B44D 3/12 | 220/755 |
| 2016/0271999 | A1 * | 9/2016 | Beta | F16M 11/42 | |
| 2016/0368312 | A1 * | 12/2016 | Cooper | B44D 3/123 | |
| 2017/0057697 | A1 * | 3/2017 | Fee | B65D 25/2897 | |
| 2017/0311709 | A1 * | 11/2017 | McInerney | A46B 17/02 | |
| 2018/0015779 | A1 * | 1/2018 | Reynolds | A45F 5/021 | |
| 2018/0043732 | A1 * | 2/2018 | Gringer | B05C 11/10 | |
| 2018/0111411 | A1 * | 4/2018 | Jimenez | B44D 3/123 | |
| 2018/0215196 | A1 * | 8/2018 | Stapleton | B44D 3/127 | |

* cited by examiner

ADJUSTABLE BRUSH HOLDING ASSEMBLY

CROSS-REFERENCE TO RELATED APPLICATIONS

This application comprises a continuation-in-part application claiming priority to U.S. application Ser. No. 16/508,295 filed Jul. 10, 2019, which claims the benefit of priority to U.S. Provisional Application No. 62/695,903 filed Jul. 10, 2018, the entireties of which are hereby incorporated by reference.

BACKGROUND OF THE INVENTION

The present subject matter relates generally to a paint brush holder designed to keep the bristles of a paint brush wet while the paint brush is temporarily not in use.

One of the principle problems with the task of painting, whether it be interior or exterior, is keeping the brush from drying out between painting tasks, resulting in the paint brush becoming difficult to work with or unusable without a complete cleaning. Paint exposed to air while on the brush will begin to dry quickly, forming a sticky residue which prevents the paint from flowing freely onto the surface being painted.

If the painter stops painting even for just minutes, the exposure of the paint brush to air causes the paint on the brush to harden on the brush, impeding its usefulness and intended purpose. One way to keep the brush supple is to prevent air from hardening the paint by keeping the bristles submerged in the paint.

One of the conventional methods of addressing this issue include a clip that snaps onto an upper edge of a paint can. The clip includes outward facing magnets to which the ferrule or metallic portion of the paint brush attach. The drawback is that as the height of the paint within the can progressively decreases during the painting process, the bristles are no longer submerged in the paint and become exposed to the air. The brush being held in a fixed location on the paint container begins to dry out within minutes as the wet paint drips off the brush when the paint brush tip is not submerged.

A further disadvantage is that the conventional device attaches manually to the top of the paint container, making it difficult to remove or place back in position without ample time and effort. In addition, certain such systems also need to be removed during painting as they interfere with access to the paint in the paint container.

Yet another disadvantage of conventional systems is a snap attachment prevents the paint lid from being attached on the paint container to close the paint container. Without closure, a film forms on the top surface of the paint within the paint can.

Accordingly, there is a need for an apparatus and method of maintaining the usability of the paint brush during a painting session wherein the painter takes temporary breaks of not painting without having to fully clean the paint brush each time before resuming painting.

BRIEF SUMMARY OF THE INVENTION

The present disclosure provides a brush holder assembly to maintain the usability of a paint brush during temporary breaks in the painting process. Various examples of the apparatus and methods are provided herein.

Specifically, the present brush holder assembly is designed to keep the operable end of the brush (e.g., the 1.5 in. length of bristles that apply the paint to the painted surface), submerged in the paint within the paint can while the painter is actively painting, instead of just laying it aside causing the brush to dry out and be out of reach.

In one embodiment, the brush holder assembly includes an inner tube that is partially received in an outer tube in a telescoping manner. An attachment mechanism protrudes from an upper end of the inner tube to receive the paint brush. A lower end of the outer tube includes a securement means to attach the brush holder assembly 100 to the paint container, such as a metal paint can. In one embodiment, the securement means is a plurality of magnets spanning the height of the paint can. A turn screw secures the inner tube in place relative to the outer tube to allow for adjustment of the telescoping nature. The height of the attachment mechanism can be adjusted so that the paint brush can be lowered as paint is used and the paint level within the paint can lowers. The present brush holder assembly may be used with any suitable paint applicator including a brush, a roller, a sponge, or the like.

An advantage of the present apparatus is providing an adjustable mechanism such that the operable end of the paint brush remains submerged in the paint throughout all levels of the paint in the paint container. In other words, as the paint in the container is used and the height of the paint in the container decreases, the present apparatus can adjust the position of the paint brush such that the operable end of the paint brush remains submerged in the paint no matter the height of the paint in the container.

A further advantage of the present system is allowing a painter to intermittently break or pause during painting without drying out the brush, allowing the painter to pick up exactly where he left off with the use of the paint brush without having to wash or remove any dried paint on the brush tip. The present system allows breaks or pauses of painting for minutes and up to hours.

Another advantage of the present system is that it can be configured to easily attach to the paint container (e.g., via magnets). As such, the painter can easily and quickly attach and/or remove the device from the paint container, for example, when the painter needs to fill a paint tray with the paint in the paint container.

Another advantage of the present system is providing a plastic lid for the paint container that has a cut out for the brush to remain in the paint while the lid is protecting the surface of the paint from developing a skin. For example, the present disclosure can provide a soft, plastic snap-on lid for the paint container that can easily be trimmed to allow for the size of the brush being used by the painter. The lid allows the brush to remain in the can during longer periods of non-use while the plastic lid further prevents the surface of the paint from forming a skin.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the description.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

FIGS. 1-5 illustrate an example of a brush holder assembly 100 that is configured to attach to a conventional paint container. The brush holder assembly 100 can releasably hold a paint brush 102 such that the paint bristles remain submerged in the paint remaining in the paint container 104 to prevent the bristles from drying out. The height of the brush holder assembly 100 is adjustable so that the point at which the paint brush is mounted onto the assembly 100 can be lowered as the paint level within the paint container 104 lowers. In other words, the brush holder assembly 100 allows for the brush bristles to remain submerged in the paint as the paint is used and the paint level drops. While FIG. 1 demonstrates the use of the brush holder assembly 100 with a brush 102 in a paint can 104, the brush holder assembly 100 can be used with and painting tool within any container for housing liquids.

Figure 1:
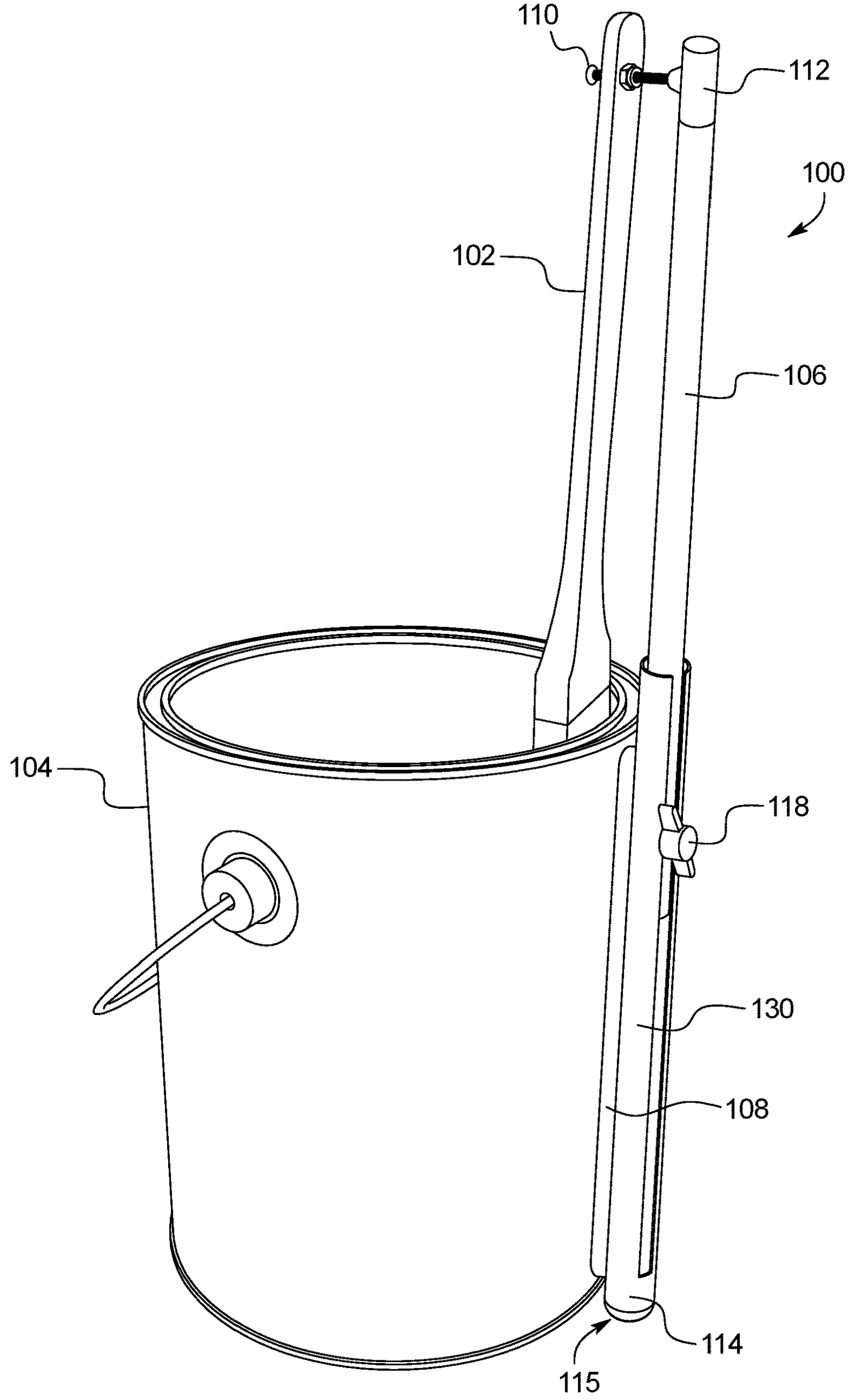
FIG. 1 is an isometric view of a brush holder assembly described in the present application.
Figure 2A:
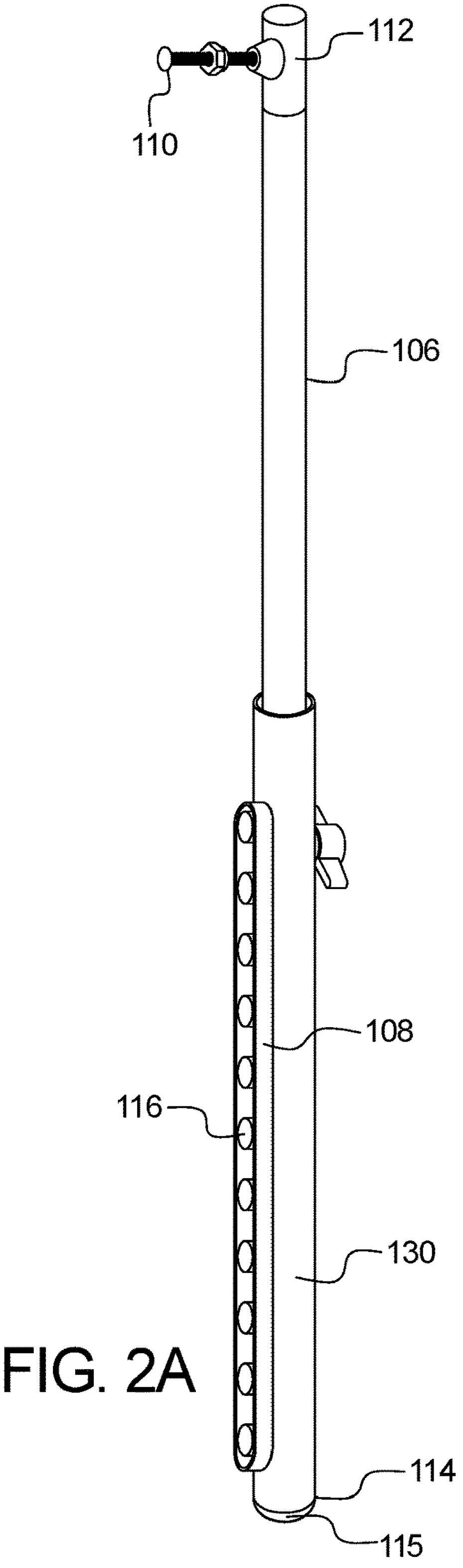
FIGS. 2A and 2B are a front side view and a back side view of the brush holder assembly of FIG. 1.
Figure 2B:
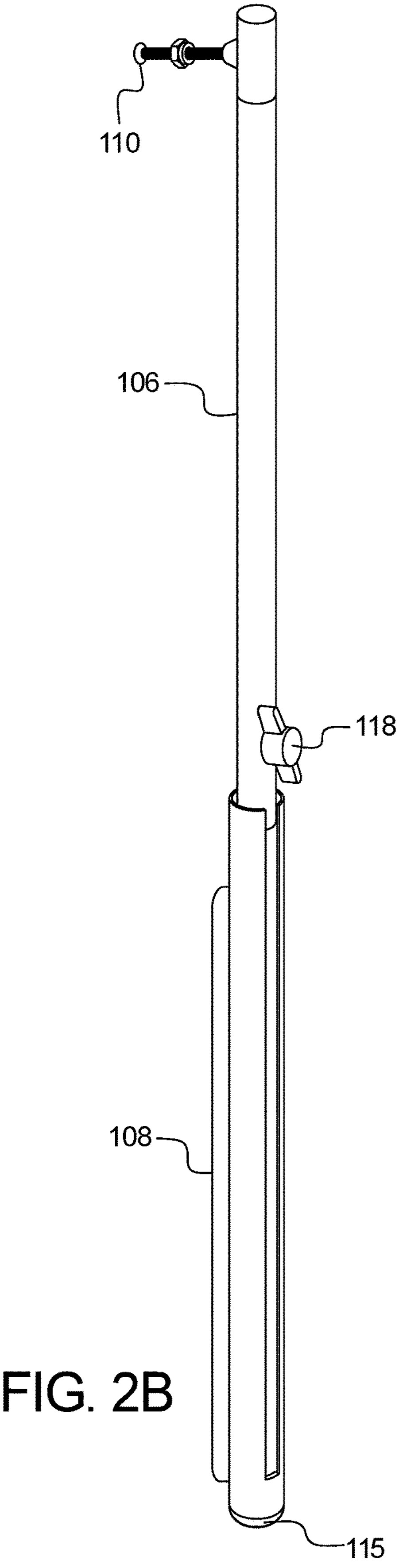

As shown in FIG. 1, the brush holder assembly 100 includes an inner tube 106 that is partially received in an outer tube 108 in a telescoping manner. An attachment mechanism 110 protrudes from an upper end 112 of the inner tube 106 to provide a surface onto which the paint brush 102 is removably positioned. A lower end 114 of the outer tube 108 includes a securement means 116 to attach the brush holder assembly 100 to the paint container 104, such as a metal paint can. The securement means 116 may be a plurality of magnets spanning a height of 9 in., corresponding to the height of a paint can 104. Each standard paint brush includes a hole near the end of the handle. During use, the paint brush 102 is attached to the brush holder assembly 100 by slipping the paint brush 102 onto the attachment mechanism 110 by means of the hole in the handle. However, it should be understood that the present assembly system can be used with any suitable paint applicator including a roller, a sponge, or the like.

In some embodiments, the inner and outer tubes 106, 108 can expand to a height of about 0.5 feet to about 2 feet. This range of height allows a standard paint brush 102 to be held in place with its bristles submerged in a full can of paint 104. Conversely, the inner tube 106 may be completely withdrawn inside the outer tube 108 such that the operable end of the paint brush is submerged in the paint when the paint within the paint container 104 is low (e.g., about 1 in. in height). In an example, a width of the inner and outer tubes 106, 108 may range between about 0.2 in. to about 1 in. (e.g., ⅝ in.). A wall thickness may range between about 0.1 in. to about 1 in. (e.g., 7/16 in.). The outer tube 108 may have a height of preferably about 5 in. to about 12 in. long, more preferably about 8 to about 10 in.

Figure 3A:
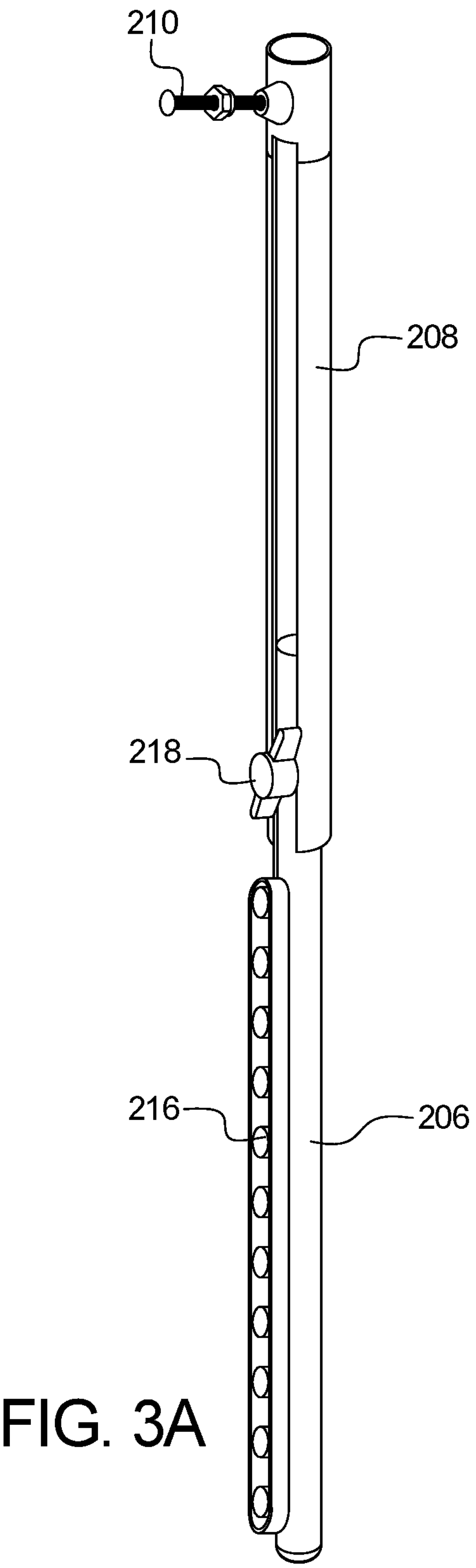
FIGS. 3A and 3B are a front side view and a back side view of an alternative embodiment of the brush holder assembly of FIG. 1.
Figure 3B:
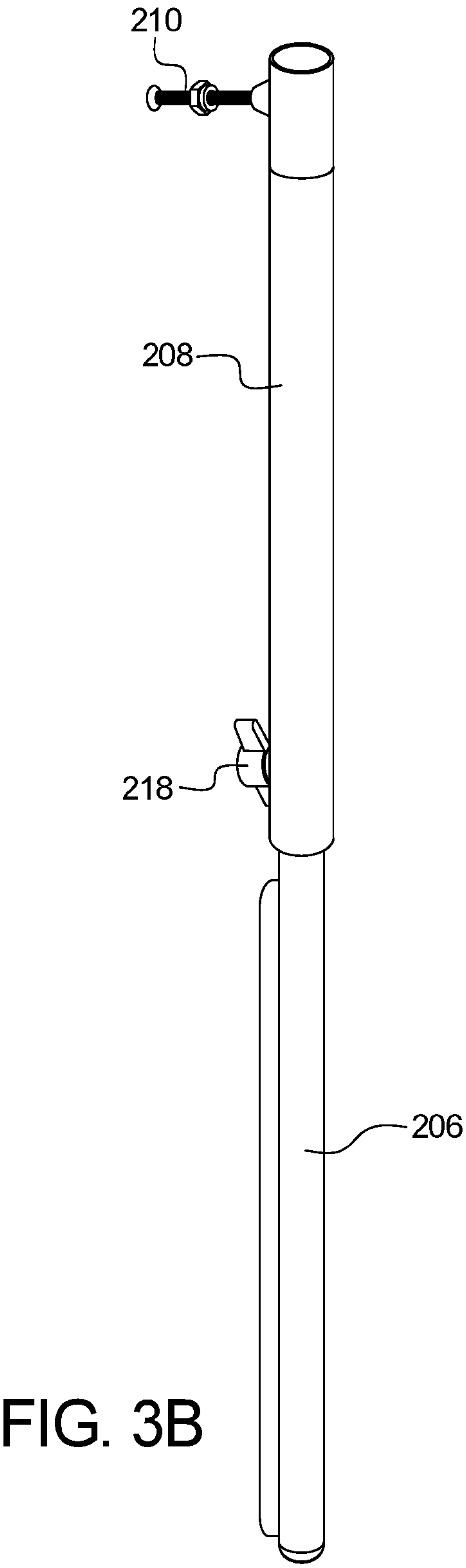

The height of the of the brush holder assembly 100 is adjustable by way of a turn screw or other tightener 118, such as a clamp. The inner tube 106 moves in and out of the outer tube 108 to adjust the height of the brush holder assembly 100, and the inner tube 106 maintains its position within the outer tube 108 through the use of the turn screw 118. In an alternative embodiment brush holder assembly 200 as shown in FIGS. 3A and 3B, the outer tube 208 is above the inner tube 206 such that the outer tube 208 moves up and down on the inner tube 106. In this embodiment, the outer tube 208 includes the attachment means 210 for the holding the brush 102, and the securement means 216 are attached to an outer surface of the inner tube 206. In both arrangements, the turn screw or other tightener 218 is used to maintain the positioning of the upper tube 106, 208 to the lower tube 108, 206.

In the illustrated embodiment, the turn screw 118 includes a threaded surface 118*a* adjacent an oval head 118*b*. The threaded surface 118*a* extends through a side wall 120 (see FIG. 4) at a lower end 122 of the inner tube 106. Rotation of the oval head 118*b* causes the turn screw 118 to move through the side wall 120. With the inner tube 106 positioned within the outer tube 108, rotation of the oval head 118*b* in one direction causes the threaded portion 118*a* to protrude further from the inner tube 106 such that a tip 118*c* of the tightener 118 strikes the outer tube 108, creating pressure and securing the positioning of the inner tube 106 relative to the outer tube 108. Rotation of the oval head 118*c* in the opposite direction causes the threaded surface 118*a* to be withdrawn into the inner tube 106, releasing pressure of the tip 118*c* on the outer tube 108 and releasing the positioning of the inner tube 106 relative to the outer tube 108.

In other embodiments, the turn screw or tightener 118 may include a knurled surface having a flat head or other shape. The turn screw 118 may extend through one or more side walls of the inner tube, depending on the shape of the inner tube.

In lieu of a turn screw or tightener, the inner tube 106 may include a small post protruding outwardly from the side wall 120 that is received in one of a plurality of openings within a side wall of the outer tube 108. The selection of the hole into which the post extends allows the user to adjust the height of the inner and outer tubes 106, 108. The user may then choose the height of the brush holder assembly 100 to ensure the bristles of the brush are fully contained in the paint within the paint can 104 by sliding the inner tube 106 outward from the outer tube 108, fixing the height by way of a small thumbscrew at the base of the inner tube 106. As the level of paint within the paint can 104 decreases during the process of painting, the user may easily adjust the positioning of the inner tube 106 relative to the outer tube 108 such that the bristles are kept within the paint.

The cross section of the inner and outer tubes 106, 108 can be any suitable shape including, but not limited to, circular, square, rectangular, oval, etc. The tubular body can include three or more sections. For example, the tubular body can include an outer tube, a first inner tube, and a second inner tube such that the second inner tube can retract into the first inner tube, and the first inner tube can retract into the outer tube.

Figure 5:
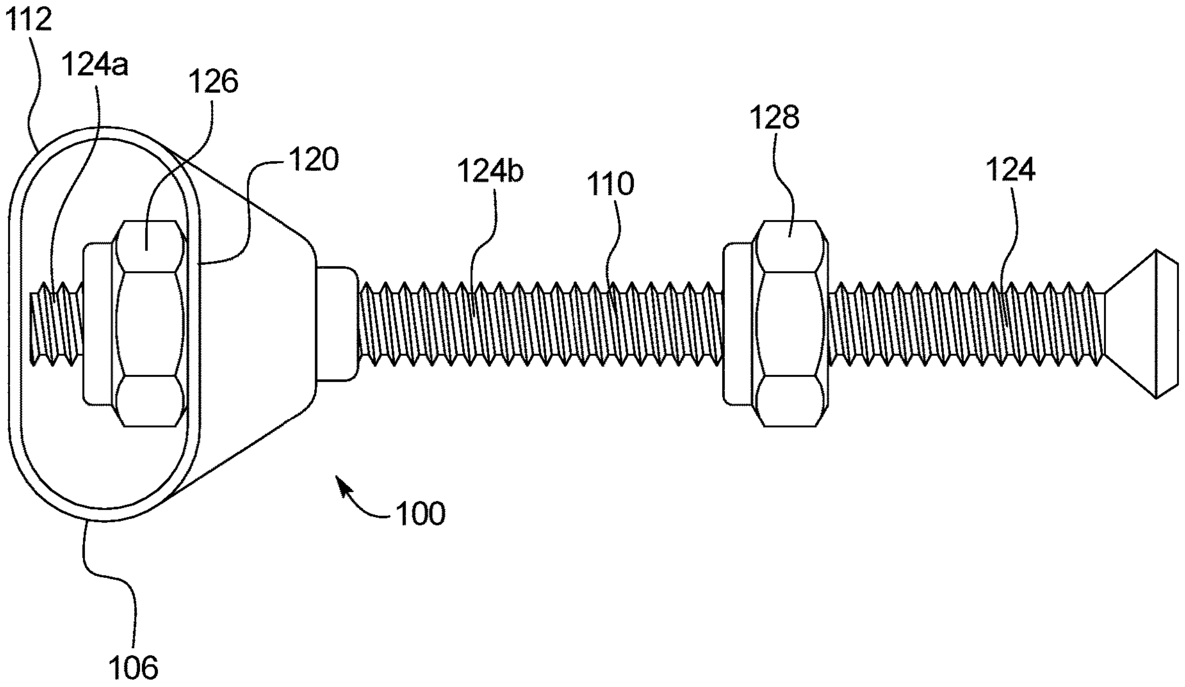
FIG. 5 is a plan view of the brush holder assembly of FIG. 1.

The attachment mechanism 110 at the upper end 112 of the inner tube 106 is configured to removably receive the paint brush 102. The attachment mechanism 110 may be any protruding surface such as, but not limited to, a hook, a bar, a clip, or a clamp. The attachment mechanism 110 in the illustrated embodiment is a bolt 124 that extends through the side wall 120 at the upper end 112 of the inner tube 106. Referring to FIG. 5, a first hex nut 126 is positioned within the inner tube 106 to receive the tip 124*a* of the bolt 124. A second hex nut 128 is positioned on a threaded surface 124*b* of the bolt 124 to serve as a positioning surface to block movement of the paint brush 102 further on the bolt 124 towards the inner tube 106. The second hex nut 128 may be moved along the threaded surface to position the paint brush so that it hangs directly downward and into the paint can 104.

In other embodiments, the attachment mechanism 110 may be a hook projection to which a paint brush handle can attach. The hook may be about 1 in. to 1.5 in. in length and positioned about a half inch from the upper end 112 of the inner tube 106. During use, the hole in the handle of the paint brush 102 is placed on the hook.

In still other embodiments, the attachment mechanism 110 may include a clamp extending from the upper end of the inner tube. The paint brush 102 can simply snap into place using a pressure fit between the paint brush handle and the clamp. Alternatively, or in addition to, the clamp may include a tightening mechanism to adjust the size of the opening of the clamp in order to receive a variety of sized paint handles. In some embodiments, the attachment mechanism 110 may be movable along the height of the inner tube 106 so that the user can adjust the position the height at which the paint brush is positioned.

The bottom end of the outer tube 108 includes a securement means 116 to attach the brush holder assembly 100 to the paint container (e.g., metal paint can). The securement means 116 are provided to allow the brush holder assembly 100 to be easily attached and detached from the paint container 104. In the illustrated embodiment, the securement means 116 include a plurality of ¼-in. thick magnets spanning a magnet height of 9 in., which corresponds to the height of a standard paint can 104. Spreading the magnetic force along the height of the paint can 104 allows for sufficient strength to maintain the paint brush over the paint can while minimizing a singular, localized force that, if struck unintentionally, could cause the paint can to be knocked over and spill. Through the use of the magnets, the brush holder assembly 100 can be quickly attached and removed from the outer surface of a metal paint container 102.

The plurality of magnets 116 may be spaced evenly along the magnet height to disperse the force attaching the brush holder assembly 100 along the height of the paint can 104. The plurality of magnets may be positioned immediately adjacent to one another or with a spacing of between about 0.1 in to 2 in. In one embodiment, each magnet is a standard, ceramic magnet, although the type, size, and strength of the magnets may be modified per user preference. The magnets can be secured to the outer tubing by any conventional means such as, but not limited to, adhesive, glue, screw, tape, clip, etc. The magnets are placed on the outer surface of the side wall 130 of the outer tube 108, although the magnets may be positioned elsewhere along the bottom portion of the outer tube 108.

Alternative to the magnets, or in addition to, the outer tube 108 may include an secondary securement means that projects from the upper end of the side wall of the outer tube 108 to attach to the rim of the paint container. The secondary securement means may be any suitable securing device such as a clip, a clamp, or a hook. The secondary securement means further secures the brush holder assembly to the paint container in addition to or instead of the securement means. Such configuration can be advantageous when the brush holder assembly is used with non-metallic paint cans.

The lower end 114 of the outer tube 108 may include a rounded surface 115 as shown in the figures to protect work surfaces from scratching or other damage. During use, the user can place the bottom end 114 of the outer tube 108 on the ground surface adjacent to the paint can with the tubes at an angle away from the paint can 104, slide the bottom end 114 on the ground surface toward the paint can 104, and once the bottom end 114 contacts the paint can 104, move the brush holder assembly 100 to a vertical position so the magnets attach to the side of the paint can 104. This process ensures that the bottom of the brush holder assembly 100 is properly positioned on the paint can 104.

Figure 4:
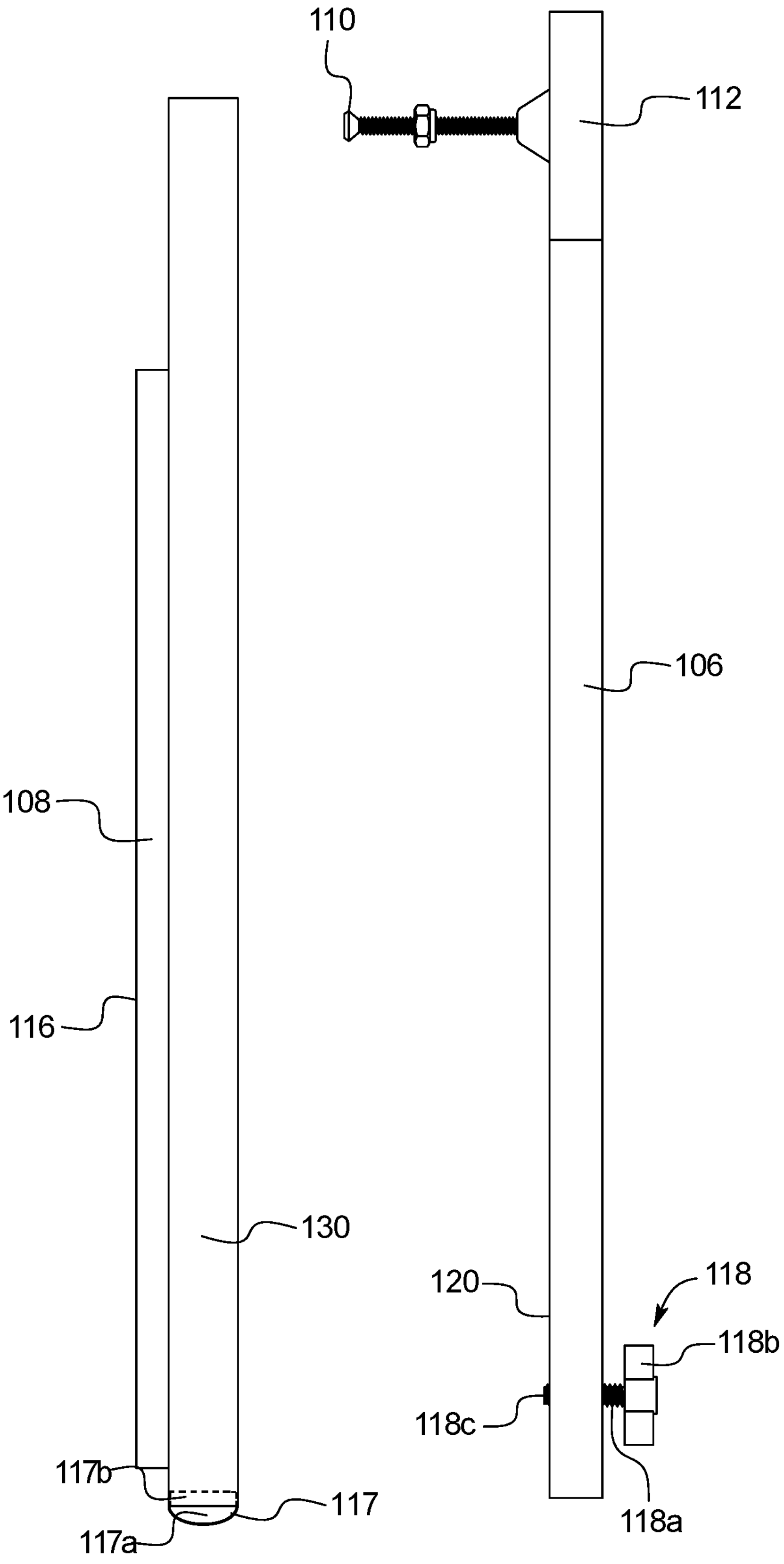
FIG. 4 is an exploded view of the brush holder assembly of FIG. 1.

In one example embodiment, the rounded surface 115 includes an insert 117 that is received by the lower end 114 of the outer tube 108. For example, the insert 117 may comprise a hard plastic material, a durable foam material, or any other suitable material to prevent the surface on which the paint can is placed from becoming scratched, marked, or otherwise affected. The insert 117 may include a rounded portion 117*a* extending from a plug portion 117*b*, the plug portion 117*b* being inserted into the lower end 114 of the outer tube 108 and held within through a friction force and optionally an adhesive. The rounded portion 117*a* is positioned outside of the lower end 114 of the outer tube 108 as shown in FIG. 4.

In one embodiment, the brush holder assembly 100 is used in conjunction with a disposable paint container lid that attaches to the opening of a paint container 104 and includes a cut-out through which the paint brush handle 102 extends through the lid. The paint container lid can have a planar surface body so that the paint brush 102 attached to the brush holder assembly 100 extends through the cut-out in the paint container lid in order for the bristles to be submerged in the paint while the lid is in place on the paint container 104. The lid limits exposure of the paint surface to air, preventing a film from forming on the surface of the paint within the paint container 104. The lid also serves to prevent dissemination of paint odors. During use, a painter may wrap a towel or other cloth around the handle to close any air gaps provided by the cut-out.

The assembly is designed to be compatible with a conventional one gallon, metallic paint container, but can be used with conventional one quart metallic paint containers as well. An adapter can be used to allow the apparatus to be used with non-metallic paint containers. For example, the adapter can include a strip of metal having a width of ⅝-in. and a height of 7¼-in. for use with a one-gallon paint can, or a strip having a width of ⅝-in. and a height of 4¼-in. for use with a one quart paint can. The metal strip may be attached to the non-metallic paint can by way of an adhesive strip in order to provide surface to which a plurality of magnets attaches.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

The invention claimed is:

1. A holder assembly for holding a painting tool within a paint container, the holder assembly comprising:

an inner tube;

an outer tube that receives the inner tube, wherein the inner tube is vertically adjustable relative to the outer tube;

a painting tool member for receiving the painting tool thereon, wherein the painting tool member extends from one of the inner tube and the outer tube; and a tightener for securing a position of the inner tube within the outer tube, wherein the outer tube comprises an elongated slot that spans a substantial height of the outer tube, and wherein the tightener is configured to extend through the elongated slot into the inner tube and be tightened to engage the outer tube creating pressure to secure the position of the inner tube with respect to the outer tube;

wherein, during use, vertical adjustment of the inner tube relative to the outer tube controls positioning of the painting tool within the paint container.

2. The holder assembly of claim 1, further comprising at least one magnet on the outer tube for removably attaching the holder assembly to the paint container, wherein the at least one magnet is configured to span a height of the paint container.

3. The holder assembly of claim 2, wherein the at least one magnet comprises a plurality of magnets.

4. The holder assembly of claim 2, wherein the at least one magnet spans a height of about 9 inches.

5. The holder assembly of claim 2, further comprising a metallic strip, wherein, when in use, the metallic strip is secured to a side of the paint container.

6. A holder assembly for holding a painting tool within a paint container, the holder assembly comprising:

an inner tube;

an outer tube that receives the inner tube, wherein the outer tube is vertically adjustable relative to the inner tube;

a painting tool member for receiving the painting tool thereon, wherein the painting tool member extends from one of the inner tube and the outer tube; and a tightener for securing a position of the outer tube along the inner tube, wherein the outer tube comprises an elongated slot that spans a substantial height of the outer tube, and wherein the tightener is configured to create pressure to secure the position of the inner tube with respect to the outer tube;

wherein, during use, vertical adjustment of the outer tube relative to the inner tube controls positioning of the painting tool within the paint container.

7. The holder assembly of claim 6, further comprising at least one magnet on the inner tube for removably attaching the holder assembly to the paint container, wherein the at least one magnet is configured to span a height of the paint container.

8. The holder assembly of claim 7, wherein the at least one magnet comprises a plurality of magnets.

9. The holder assembly of claim 7, wherein the at least one magnet spans a height of about 9 inches.

10. The holder assembly of claim 7, further comprising a metallic strip, wherein, when in use, the metallic strip is secured to a side of the paint container.

* * * * *